United States Patent
Tamura et al.

(10) Patent No.: US 9,971,259 B2
(45) Date of Patent: May 15, 2018

(54) POLYESTER RESIN, TONER CONTAINING POLYESTER RESIN, AND METHOD FOR MANUFACTURING POLYESTER RESIN

(71) Applicant: Mitsubishi Chemical Corporation, Tokyo (JP)

(72) Inventors: Yoko Tamura, Toyohashi (JP); Tadahiro Ozawa, Toyohashi (JP); Akifumi Kondo, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days. days.

(21) Appl. No.: 15/314,661

(22) PCT Filed: May 28, 2015

(86) PCT No.: PCT/JP2015/065417
§ 371 (c)(1),
(2) Date: Nov. 29, 2016

(87) PCT Pub. No.: WO2015/182707
PCT Pub. Date: Dec. 3, 2015

(65) Prior Publication Data
US 2017/0192369 A1    Jul. 6, 2017

(30) Foreign Application Priority Data

May 30, 2014    (JP) .................. 2014-111846

(51) Int. Cl.
*G03G 9/087* (2006.01)
*G03G 9/08* (2006.01)
*G03G 15/08* (2006.01)

(52) U.S. Cl.
CPC .............. *G03G 9/081* (2013.01); *G03G 9/087* (2013.01); *G03G 9/08755* (2013.01); *G03G 9/08797* (2013.01); *G03G 15/0865* (2013.01)

(58) Field of Classification Search
CPC .................................................. G03G 9/08755
See application file for complete search history.

(56) References Cited

U.S. PATENT DOCUMENTS

| | | | |
|---|---|---|---|
| 8,461,288 B2 | 6/2013 | Joung et al. | |
| 2012/0214960 A1 | 8/2012 | Joung et al. | |
| 2014/0004460 A1* | 1/2014 | Yoshiba ............ | G03G 9/08755 430/108.23 |

FOREIGN PATENT DOCUMENTS

| | | |
|---|---|---|
| CN | 102597049 | 7/2012 |
| JP | 6-56974 A | 3/1994 |
| JP | 2011-028170 A | 2/2011 |
| JP | 2013-508500 A | 3/2013 |
| KR | 10-2011-0043969 | 4/2011 |

OTHER PUBLICATIONS

International Search Report dated Aug. 25, 2015, in PCT/JP2015/065417, filed May 28, 2015.
Office Action dated Aug. 31, 2017, in Korean Patent Application No. 10-2016-7033383.
Office Action dated Dec. 4, 2017, in Chinese Patent Application 201580025823.2.

* cited by examiner

*Primary Examiner* — Hoa V Le
(74) *Attorney, Agent, or Firm* — Oblon, McClelland, Maier & Neustadt, L.L.P.

(57) ABSTRACT

To provide a crosslinked polyester resin by using environmentally friendly and low-cost raw materials while reducing the content of a bisphenol A-derived component.
[Subject Matter]
[Solutions]
To provide a polyester resin containing a trivalent or higher acid-derived component and a bisphenol A-alkylene oxide adduct-derived component. In such a polyester resin, the bisphenol A-alkylene oxide adduct-derived component is contained at 0.01~0.35 mol relative to 1 mol of all the acid-derived components, and the ratio of acid value (mg KOH/g) to hydroxyl value (mg KOH/g) is set to be 1:3~1:26.

9 Claims, No Drawings

POLYESTER RESIN, TONER CONTAINING POLYESTER RESIN, AND METHOD FOR MANUFACTURING POLYESTER RESIN

TECHNICAL FIELD

The present invention relates to a polyester resin used for developing electrostatically charged images or magnetic latent images in electrophotography, electrostatic recording, electrostatic printing and the like. The present invention also relates to a toner containing the polyester resin and a method for manufacturing the polyester resin.

BACKGROUND ART

When an image is formed by using an electrophotographic or electrostatic imaging method, electrostatically charged images formed on a photoreceptor are developed by a toner that is electrically charged in advance through friction, and then the images are fixed. Examples of image-fixing methods are a hot-roll method for fixing the developed toner image by compressing a hot roll; and a non-contact fixing method for fixing the toner image by using an electric oven or flash beams. To go through those procedures without encountering problems, it is necessary for the toner to maintain a stable charge level and to have excellent fixability onto the paper. In addition, since an image-forming apparatus includes a heating device as the fixing component and thus its internal temperature increases, it is necessary to prevent toner blocking. Moreover, no smudges on the apparatus and no overlapping results on the printed surface should appear during continuous printing operations; namely, toner durability is required.

Furthermore, in a hot-roll method, temperature settings of the fixing component have been getting lower from the viewpoint of saving energy. Accordingly, toners are required to have properties for fixing images onto paper at lower temperatures; namely, low-temperature fixability is in great demand. In addition, apparatuses are becoming more compact, and rollers are not coated with a release agent. Thus, demand for the toner that can be released easily from the hot roll, namely, the hot offset resistance of a toner, is growing. Also, to obtain high quality images, toners are required to have smaller particle sizes and improved gloss.

Toner binder resins have a significant impact on the aforementioned toner properties. Examples of binder resins are polystyrene resins, styrene-acrylic resins, polyester resins, epoxy resins, polyamide resins and the like. Among them, polyester resins have drawn attention because of their toughness, excellent low-temperature fixability, and well balanced properties.

Preferred polyester resins for toners are those capable of achieving both fixability in a low-temperature range and hot offset resistance in a high-temperature range. To obtain such properties, widely employed methods for designing polyester resins are branching or crosslinking resins by adding a trivalent or higher carboxylic-acid or alcohol component.

To manufacture polyester resins, methods have been studied for preventing coloration of resins by using a metal-containing compound as the polymerization catalyst.

For example, Patent Literature 1 describes a polyester resin formed with a trivalent or higher carboxylic-acid or alcohol component, dicarboxylic acid, aromatic diol and aliphatic diol, as well as a method for manufacturing such a polyester resin by controlling the vacuum degree.

Patent Literature 2 describes a method for reducing the metal content to prevent coloration of polyester resin.

CITATION LIST

Patent Literature

Patent Literature 1: JPH06-56974A
Patent Literature 2: JP2011-28170A

SUMMARY OF THE INVENTION

Problems to be Solved by the Invention

However, the polyester resin described in Patent Literature 1 contains a large amount of bisphenol A-derived component, and it is thereby difficult to achieve a low manufacturing cost. In addition, when the manufacturing method in Patent Literature 1 is employed, polycondensation time is prolonged, resulting in low productivity.

Also, since the method described in Patent Literature 2 does not use aromatic diol, crystallization tends to occur, causing insufficient toner performance.

The objective of the present invention is to solve the above-mentioned problems and to provide a crosslinked polyester resin by using environmentally friendly and low-cost materials while reducing the content of a bisphenol A-derived component. Also, another objective of the present invention is to solve problems identified in conventional manufacturing methods, thereby providing a method for manufacturing a polyester resin capable of forming a toner that exhibits excellent properties such as storage stability, hot offset resistance, low-temperature fixability and image stability while offering excellent productivity.

Solutions to the Problems

An aspect of the present invention is a polyester resin, containing a trivalent or higher acid-derived component and a bisphenol A-alkylene oxide adduct-derived component: in the polyester resin, the content of a bisphenol A-alkylene oxide adduct-derived component is 0.01~0.35 mol relative to 1 mol of all the acid-derived components; and the ratio of acid value (mg KOH/g) to hydroxyl value (mg KOH/g) is 1:3~1:26. Another aspect of the present invention is a method for manufacturing a polyester resin by polycondensing a monomer mixture that contains polyhydric alcohol and polycarboxylic acid: in the manufacturing method, the monomer mixture is set to contain a trivalent or higher acid component and 0.01~0.35 mol of a bisphenol A-alkylene oxide adduct relative to 1 mol of all the acid components; and the ratio of the number of carboxyl groups to the number of hydroxyl groups is set to be 1:1.13~1:1.30 at the time of preparing the monomer mixture.

Embodiments of the present invention may be as follows:
[1] A polyester resin, containing a trivalent or higher acid-derived component and a bisphenol A-alkylene oxide adduct-derived component, in which the content of the bisphenol A-alkylene oxide adduct-derived component is 0.01~0.35 mol relative to 1 mol of all the acid-derived components, and the ratio of acid value (mg KOH/g) to hydroxyl value (mg KOH/g) is 1:3~1:26.
[2] The polyester resin according to [1] above, in which the trivalent or higher acid-derived component is contained at 0.01~0.30 mol in 1 mol of all the acid-derived components.

[3] The polyester resin according to [1] or [2] above, in which the metal content derived from a polymerization catalyst is 20 ppm or lower.
[4] A toner containing the polyester resin according to any of [1]~[3] above.
[5] A method for manufacturing a polyester resin by polycondensing a monomer mixture containing a polyhydric alcohol and a polycarboxylic acid, in which the monomer mixture contains a trivalent or higher acid component and 0.01~0.35 mol of a bisphenol A-alkylene oxide adduct relative to 1 mol of all the acid components, and the ratio of the number of carboxyl groups to the number of hydroxyl groups at the time of preparing the monomer mixture is 1:1.13~1:1.30.
[6] The method for manufacturing a polyester resin according to [5] above, in which the trivalent or higher acid component is contained at 0.01~0.30 mol in 1 mol of all the acid components.
[7] The method for manufacturing a polyester resin according to [5] or [6] above, in which polymerization is carried out by setting the amount of a polymerization catalyst at no greater than 20 ppm.

Effects of the Invention

According to the present invention, a polyester resin is produced by using environmentally friendly and low-cost materials while reducing the content of a bisphenol A-alkylene oxide adduct-derived component. Also, a toner containing such a polyester resin is provided.

Moreover, according to the present invention, a manufacturing method is provided for producing a polyester resin capable of forming a toner that exhibits excellent properties such as storage stability, hot offset resistance, low-temperature fixability and image stability while offering excellent productivity.

DETAILED DESCRIPTION OF THE EMBODIMENTS

<Polyester Resin>
In the polyester resin related to the present invention,
(i) a trivalent or higher acid-derived component and a bisphenol A-alkylene oxide adduct-derived component are contained;
(ii) the content of the bisphenol A-alkylene oxide adduct-derived component is 0.01~0.35 mol relative to 1 mol of all the acid-derived components; and
(iii) the ratio of acid value (mg KOH/g) to hydroxyl value (mg KOH/g) is 1:3~1:26.

A "trivalent or higher acid-derived component" in the polyester resin related to the present invention is a resin component, which is derived from a "trivalent or higher acid" used as a raw material. It means a residue other than a group that leaves the acid when the acid forms an ester bond with an alcohol component. For example, when a trivalent or higher acid is a tricarboxylic acid (R(—COOH)$_3$), where ester bonds are formed in all the carboxylic acids, (R—(CO)$_3$) is the "trivalent or higher acid-derived component" in the polyester resin.

A "trivalent or higher acid" component that provides a "trivalent or higher acid-derived component" is an acid component having at least three hydrogen atoms that can be released as H$^+$ in the molecule, or an ester or anhydride of the acid. Examples of such an acid are trivalent or higher aliphatic or aromatic carboxylic acids, their esters and anhydrides. The acid is more preferred to be trivalent or higher but hexavalent or lower, even more preferably trivalent or quadrivalent. A trivalent or higher aliphatic carboxylic acid may have a linear, branched or ring structure. Examples are C1~C10 aliphatic carboxylic acids. Examples of aromatic carboxylic acids are C6~C18 aromatic carboxylic acids, more specifically, trimellitic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, and their esters or anhydrides; pyromellitic acid, 1,2,7,8-octanetetracarboxylic acid, and their esters or anhydrides. Considering availability for industrial use, trimellitic acid or its anhydride is preferred.

According to the present invention, when a polyester resin containing a trivalent or higher acid-derived component is used to form a toner, fixability and hot offset resistance of the toner are excellent.

In a polyester resin related to the present invention, the content of a trivalent or higher acid-derived component relative to 1 mol of all the acid-derived components is preferred to be 0.01~0.30 mol. By setting the content to be at least 0.01 mol, the toner exhibits excellent fixability and hot offset resistance; and by setting the content to be no greater than 0.30 mol, excellent storage stability is achieved, while a gelation reaction is easier to control during the polycondensation reaction. The upper limit of the content of the trivalent or higher acid-derived component is more preferred to be no greater than 0.25 mol relative to 1 mol of all the acid-derived components.

The polyester resin related to the present invention may also contain another component derived from a polycarboxylic acid other than a trivalent or higher acid-derived component. Examples of a polycarboxylic acid that provides another polycarboxylic acid-derived component are aromatic dicarboxylic acid components such as terephthalic acid, isophthalic acid, phthalic acid, dimethyl terephthalate, dimethyl isophthalate, diethyl terephthalate, diethyl isophthalate, dibutyl terephthalate, dibutyl isophthalate, their anhydrides; and aliphatic dicarboxylic acid components such as succinic acid, adipic acid, sebacic acid, isodecyl succinic acid, dodecenyl succinic acid, maleic acid, fumaric acid, their esters or anhydrides.

The amount of an aromatic dicarboxylic acid is not limited specifically, but is preferred to be 0.6~0.9 mol in 1 mol of all the acid-derived components. When the amount of an aromatic dicarboxylic acid is at least 0.6 mol, the storage stability of toner is excellent, and the resin strength is expected to be enhanced. The lower limit of the amount of aromatic dicarboxylic acid is more preferred to be at least 0.7 mol. Considering the cost and ease of handling, terephthalic acid or isophthalic acid is preferred.

A "bisphenol A-alkylene oxide adduct-derived component" of a polyester resin related to the present invention is a resin component derived from a "bisphenol A-alkylene oxide adduct" used as a raw material, and means a residue excluding hydrogen atoms that leave when the alcohol forms an ester bond with an acid component. Examples of a "bisphenol A-alkylene oxide adduct" that provides a "bisphenol A-alkylene oxide adduct-derived component" are not limited specifically, and propylene oxide adducts or ethylene oxide adducts of bisphenol A may be used, and the number of moles added is preferred to be 2~6. Specific examples are polyoxypropylene-(2.3)-2,2-bis(4-hydroxyphenyl)propane, polyoxyethylene-(2.0)-2,2-bis(4-hydroxyphenyl)propane, polyoxypropylene-(2.0)-2,2-bis(4-hydroxyphenyl)propane, polyoxypropylene(2.2)-polyoxyethylene-(2.0)-2,2-bis(4-hydroxyphenyl)propane, polyoxypropylene(6)-2,2-bis(4-hydroxyphenyl)propane, polyoxypropylene(2.2)-2,2-bis(4- hydroxyphenyl)propane, polyoxypropylene-(2.4)-2,2-bis(4-hydroxyphenyl)propane, polyoxypropylene(3.3)-2,2-bis(4-hydroxyphenyl)propane, and the like.

The polyester resin related to the present invention contains 0.01~0.35 mol of a bisphenol A-alkylene oxide adduct-derived component relative to 1 mol of all the aforementioned acid-derived components. It is preferred to contain 0.1~0.32 mol, more preferably 0.15~0.3 mol, of a bisphenol A-alkylene oxide adduct-derived component relative to 1 mol of all the aforementioned acid-derived components.

In addition, the polyester resin related to the present invention may also contain a polyhydric alcohol-derived component other than a bisphenol A-alkylene oxide adduct-derived component. An aliphatic diol or the like may be used as a polyhydric alcohol that provides another polyhydric alcohol-derived component. Examples of aliphatic diols are ethylene glycol, neopentyl glycol, propylene glycol, butane glycol, polyethylene glycol, 1,3-propanediol, 1,4-butanediol, diethylene glycol, triethylene glycol, 1,4-cyclohexanedimethanol, isosorbide and the like. They may be used alone or in combination thereof. Also, aliphatic diols and aromatic diols may be used in combination thereof.

Moreover, any trivalent or higher polyalcohol other than the above diols may be used for the polyalcohol component unless it reduces the effects of the present invention. It is preferred to use at least trivalent but no higher than pentavalent, more preferably trivalent or quadrivalent, alcohol. Examples of a trivalent or higher alcohol are sorbitol, 1,2,3,6-hexatetralol, 1,4-sorbitan, pentaerythritol, dipentaerythritol, tripentaerythritol, 1,2,4-butanetriol, 1,2,5-pentanetriol, glycerol, 2-methyl-1,2,3-propanetriol, 2-methyl-1,2,4-butanetriol, trimethylolpropane, 1,3,5-trihydroxymethylbenzene, and the like. They may be used alone or in combination thereof. Among those listed, pentaerythritol and trimethylolpropane are especially preferred.

In the polyester resin related to the present invention, the ratio of acid value (mg KOH/g) to hydroxyl value (mg KOH/g) is 1:3~1:26. Relative to the acid value of 1, a hydroxyl value of smaller than 3 lowers image stability, and a hydroxyl value exceeding 26 causes insufficient storage stability. The ratio of acid value to hydroxyl value is preferred to be set at 1:3~1:24, more preferably at 1:3~1:20. Considering low-temperature fixability, the ratio of acid value to hydroxyl value is preferred to be 1:5~1:26.

The softening temperature of the polyester resin related to the present invention is preferred to be 120~150° C. When the softening temperature is 120° C. or higher, the hot offset resistance of the toner is expected to be enhanced, and when the softening temperature is 150° C. or lower, more preferably 145° C. or lower, fixability is expected to be better.

A polyester resin related to the present invention is preferred to be amorphous considering its performance as the binder resin of a toner. To make it amorphous, it is preferred for the types and ratios of raw materials to be appropriately adjusted.

In a polyester resin related to the present invention, the metal content derived from a polymerization catalyst is preferred to be 20 ppm or lower. The polyester resin characterized as above is obtained by carrying out a polymerization reaction without using a polymerization catalyst or by using a trace amount of polymerization catalyst.

Glass transition temperature (hereinafter referred to as Tg) of the polyester resin related to the present invention is not limited specifically, but is preferred to be 45~65° C. When Tg is 45° C. or higher, the anti-blocking properties of a toner are expected to be excellent, and when Tg is 65° C. or lower, the fixability of a toner is expected to be excellent. More preferably, the lower limit of Tg is at least 48° C.

To determine Tg, a differential thermal analyzer DSC-60 made by Shimadzu Corporation was used and the rate of temperature rise was set at 5° C./min, and the value was obtained at the point where the base line of the chart intersected with the tangent line of endothermic curve near the glass transition temperature.

The acid value of amorphous polyester resin for toners related to the present invention is not limited specifically, but is preferred to be 20 mg KOH/g or lower. When the acid value is 20 mg KOH/g or lower, the image density of a toner is expected to be stable. The upper limit of the acid value of the polyester resin is more preferred to be 15 mg KOH/g or lower, especially preferably 12 mg KOH/g or lower.

The acid value was measured as follows. Approximately 0.2 grams of a sample (A (g)) was accurately measured in a side-arm Erlenmeyer flask, to which 20 mL of benzyl alcohol was added. The mixture was heated for 15 minutes in a nitrogen ambience by using a 230° C. heater so that the resin was dissolved. After the mixture was cooled to room temperature, 20 mL of chloroform and a few drops of cresol red solution as the indicator were added. Titration was carried out by a 0.02N KOH solution (titration volume=B (mL) and the factor of KOH solution=p). In the meantime, blank measurement was conducted (titration volume=C (mL)), and the acid value was calculated by the formula below.

acid value (mg KOH/g)=$(B-C) \times 0.02 \times 56.11 \times p \div A$

The hydroxyl value of amorphous polyester resin for toners related to the present invention is not limited specifically, but is preferred to be 70 mg KOH/g or lower. When the hydroxyl value exceeds 70 mg KOH/g, storage stability and hot offset resistance tend to be lowered.

The hydroxyl value was measured as follows. Approximately 0.5 grams of a sample (W (g)) was accurately measured in a 100 mL stoppered Erlenmeyer flask, to which 20 mL of an acetylation agent (prepared by mixing 5 mL of acetic anhydride in 500 mL of pyridin) was added. The mixture was heated for an hour by immersing it in a water bath with a temperature of 95° C. or higher so as to acetylate the hydroxyl group in the sample. After the mixture was removed from the water bath and cooled, 5 mL of water was added to decompose the remaining acetic anhydride. A few drops of phenolphthalein was added as the indicator. Titration was carried out by a 0.02N KOH solution and the titration volume was recorded when the mixture turned light pink (As (mL)). In the meantime, blank measurement was conducted by the same procedure as above except that the sample was not added, and the titration volume was recorded (Ab (mL)). The hydroxyl value was calculated by the formula below.

$$\text{hydroxyl value mg } KOH/g = \frac{(Ab - As) \times 0.2 \times f}{W} \times 56.11 + \text{acid value} \quad \text{[formula 1]}$$

f: factor of 0.2N KOH

<Method for Manufacturing Polyester Resin>

A method for manufacturing a polyester resin according to an embodiment of the present invention includes polycondensing a monomer mixture containing a polyhydric alcohol and polycarboxylic acid. The monomer mixture contains a trivalent or higher acid component and 0.01~0.35 mol of a bisphenol A-alkylene oxide adduct relative to 1 mol of all the acid components, and the ratio of the number of carboxyl groups to the number of hydroxyl groups is 1:1.13~1:1.30 at the time of preparing the monomer mixture.

In the present invention, "polyhydric alcohol," "polycarboxylic acid," "trivalent or higher acid component" and "bisphenol A-alkylene oxide adduct" described above with reference to polyester resins also apply here to the manufacturing method.

In the monomer mixture used in the method for manufacturing a polyester resin related to the present invention, 0.01~0.35 mol of a bisphenol A-alkylene oxide adduct is contained relative to 1 mol of all the acid components. Relative to 1 mol of all the acid components, a bisphenol A-alkylene oxide adduct component is preferred to be contained at 0.1~0.32 mol, more preferably 0.15~0.3 mol.

In the method for manufacturing a polyester resin related to the present invention, the ratio of the number of carboxyl groups to the number of hydroxyl groups is 1.13~1.30 at the time of preparing the monomer mixture. Here, the number of carboxylic groups in a carboxylic anhydride is calculated the same as in a carboxylic acid. In addition, when the number of hydroxyl groups is counted, the OH groups in the carboxyl groups are not included.

When the number of carboxyl groups is set at 1, if the number of hydroxyl groups is set at 1.13 or greater, gelation during the polycondensation reaction is easier to control and the resultant toner is expected to exhibit excellent fixability. If the number of hydroxyl groups is set at 1.30 or smaller, reactivity is excellent, and the toner is expected to exhibit excellent storage stability. The ratio is more preferred to be 1.28 or smaller.

When a polyester resin related to the present invention is manufactured, the content of a trivalent or higher acid component in the monomer mixture is preferred to be 0.01~0.30 mol relative to 1 mol of all the acid components. By setting the content to be at least 0.01 mol, the resultant toner exhibits excellent fixability and hot offset resistance; and by setting the content to be no greater than 0.30 mol, excellent storage stability is obtained, while the gelation reaction is easier to control during the polycondensation reaction. The upper limit of the content of the trivalent or higher acid component is more preferred to be no greater than 0.25 mol relative to 1 mol of all the acid components.

In the method for manufacturing a polyester resin related to the present invention, relative to 100 molar parts of the monomer mixture, the content of a bisphenol A-alkylene oxide adduct in the monomer mixture is preferred to be at least 3 molar parts in view of storage stability and durability as well as control of crystallization, whereas the content is preferred to be no greater than 15 molar parts, more preferably no greater than 13 molar parts in view of reactivity and cost.

The lower limit of a bisphenol A-alkylene oxide adduct in 100 molar parts of the monomer mixture is more preferred to be at least 5 molar parts, even more preferably at least 8 molar parts.

The amount of an aromatic dicarboxylic acid is not limited specifically, but it is preferred to be 0.06~0.090 mol relative to 1 mol of all the acid components. When the amount of an aromatic dicarboxylic acid is at least 0.06 mol, the storage stability of a toner is expected to be excellent and the resin strength is expected to be improved. The lower limit of the aromatic dicarboxylic acid is more preferred to be at least 0.07 mol. Considering the cost and ease of handling, terephthalic acid or isophthalic acid is preferred.

Any known method may be employed for the polymerization method for manufacturing a polyester resin related to the present invention. For example, a monomer mixture containing a polyhydric alcohol, polycarboxylic acid and its lower alkyl ester are introduced into a reactor, and an esterification reaction or a transesterification reaction is carried out to distill the water or lower alkyl alcohol. Then, a polycondensation reaction is carried out while glycol is removed to enhance the polymerization degree.

In the method for manufacturing a polyester resin related to the present invention, the temperature for carrying out an esterification or a transesterification reaction is preferred to be 240° C.~280° C. By setting the temperature at 240° C. or higher, productivity is enhanced. The temperature is more preferred to be 255° C. or higher. The temperature is preferred to be set at 280° C. or lower, more preferably at 270° C. or lower, because decomposition of resin and formation of volatile odor-causing byproducts are expected to be suppressed.

The temperature for a polycondensation reaction is preferred to be set at 220° C.~250° C. When the polycondensation temperature is set at 220° C. or higher, productivity is expected to be enhanced, and at 250° C. or lower, decomposition of resin is suppressed and productivity is thereby enhanced. Also, formation of volatile odor-causing byproducts is expected to be suppressed.

The temperature for a polycondensation reaction is preferred to be set appropriately within the above range while considering the composition ratio or the like of raw materials. When a reaction mixture of a certain composition ratio has superior reactivity—for example, a composition ratio indicating a smaller amount of a bisphenol A-alkylene oxide adduct, a greater amount of a trivalent or higher acid component, a smaller number of hydroxyl groups relative to the number of carboxyl groups set as 1, and the like—it is effective to set a lower polycondensation reaction temperature. By contrast, it is effective to set a higher polycondensation temperature when a mixture of another composition ratio has inferior reactivity.

In the method for manufacturing a polyester resin related to the present invention, a polymerization catalyst is not used, or a trace amount is used if applicable. When a polymerization catalyst is used, examples are titanium catalysts such as titanium tetraalkoxide, and titanium oxide; tin catalysts such as dibutyl tin oxide, stannous oxide, tin 2-ethylhexanoate, tin acetate, and tin disulphide; zinc acetate, antimony trioxide, germanium dioxide, magnesium acetate, and the like.

When a polymerization catalyst is used, the amount is preferred to be set no greater than 20 ppm, more preferably no greater than 15 ppm, relative to the mass of monomer mixture.

When the composition is set in the above range and when the polycondensation temperature is set appropriately, reactivity during polycondensation is secured without using a polymerization catalyst. A desired polyester is obtained by setting the polycondensation time for 20~120 minutes.

<Toner>

The following description is for a toner containing the polyester resin related to the present invention.

The polyester resin related to the present invention can be used as a main component of a toner binder or may be blended with other toner binder resins. For a resin other than the polyester resin related to the present invention to be used as a binder resin, examples are polyester resins other than that of the present invention, styrene resins, styrene-acrylic resins, cyclic olefin resins, methacrylic acid resins, epoxy resins and the like. They may be used alone or in combination thereof by setting an amount that will not interfere with the effects of the present invention.

Examples of a colorant when making a toner are carbon black, nigrosine, aniline blue, phthalocyanine blue, phthalocyanine green, Hansa yellow, Rhodamine dyes and pigments, chrome yellow, quinacridone, benzidine yellow, rose bengal, triarylmethane dyes, monoazo, disazo, and condensed azo-based dyes and pigments. These dyes and pigments may be used alone or in combination thereof. In the case of a full-color toner, benzidine yellow, monoazo dyes and pigments, condensed azo-based dyes and pigments and the like may be used as yellow; quinacridone, Rhodamine dyes and pigments, monoazo dyes and pigments and the like may be used as magenta; and phthalocyanine blue and the like may be used as cyan.

The content of a colorant is preferred to be 2~10 mass % of the toner considering the color tone of the toner, image density and thermal characteristics.

For a charge control agent, quaternary ammonium salts, basic or electron-donating organic substances or the like may be used as a positive charge control agent, whereas metal chelates, metal-containing dyes, or acidic or electron-withdrawing organic substances or the like may be used as a negative charge control agent. For color toners, it is important for a charge control agent to be colorless or pale so as not to inhibit the color tones of the toner. Examples are metal salts and complexes of salicylic acid or alkyl salicylic acid with chromium, zinc, aluminum and the like, along with amide compounds, phenol compounds, naphthol compounds and the like. Furthermore, styrene-, acrylic acid-, and methacrylic acid-based vinyl polymers or vinyl polymers having sulfonic acid groups may also be used as charge control agents.

The content of a charge control agent is preferred to be 0.5~5 mass % of the toner. When the content is 0.5 mass % or greater, the toner charge level is expected to be sufficient, whereas a content of 5 mass % or less is expected to suppress a reduction of electric charge caused by an agglomerated charge control agent.

Examples of a release agent to be added for forming a toner are carnauba wax, rice wax, montan wax, beeswax, polypropylene wax, polyethylene wax, synthetic ester wax, paraffin wax, fatty acid amides, silicone-based wax, and the like. They may be used alone or in combination thereof.

The content of a release agent is not limited specifically, but it is preferred to be 0.3~15 mass % of the toner, since the content may affect the release performance, storage stability, fixability and color development of the toner. The lower limit of the content is more preferred to be at least 1 mass %, especially preferably at least 2 mass %, whereas the upper limit of the content is more preferred to be no greater than 13 mass %, especially preferably no greater than 10 mass %.

Examples of flowability modifiers as additives are flowability enhancers such as fine powders of silica, alumina and titania; inorganic fine powders of magnetite, ferrite, cerium oxide, strontium titanate and conductive titania; resistance adjusters such as styrene resin and acrylic resin; and lubricants. Those listed above may be used as internal or external additives.

The content of those additives is not limited specifically, but is preferred to be 0.05~10 mass % of the toner. When the content of those additives is 0.05 mass % or greater, performance modifying effects on the toner are expected to be sufficiently achieved, whereas a content of 10 mass % or less is expected to achieve excellent image stability of the toner.

EXAMPLES

Examples of the present invention are described below. However, it should be understood that the mode of the present invention is not limited to those described below. Evaluation of resins in the examples was conducted as follows.
(A) Evaluation Method of Resin
(1) Glass Transition Temperature (Tg)

The glass transition temperature was measured by using a differential scanning calorimeter, DSC-60, made by Shimadzu Corporation, and obtained as the value at the intersection of the baseline and the tangent of the endothermic curve near the glass transition temperature in a chart prepared by setting the rate of temperature rise at 5° C./min.
(2) Softening Temperature A softening temperature was measured using a flow tester, CFT-500, made by Shimadzu Corporation, when one half the amount was flowed out of 1.0 gram of a sample through a 1 mm φ×10 mm nozzle under conditions of a load at 294 N (30 Kgf), and a constant temperature rise of 3° C./min.
(3) Acid Value Approximately 0.2 grams of a sample was accurately weighed in a side-arm Erlenmeyer flask (A (g)), 20 mL of benzyl alcohol was added, and heat was applied to a resin for 15 minutes using a 230° C. heater to melt the resin under a nitrogen ambience. After the resin was cooled to room temperature, 20 mL of chloroform and a few drops of a cresol red solution were added as the indicator. The acid value of the resin was determined by using a 0.02N KOH solution (titration volume=B (mL), the factor of KOH solution=p). A blank measurement was also conducted (titration volume=C (mL)), and the acid value was measured by the formula below.

$$\text{Acid value (mg KOH/g)}=(B-C)\times 0.02\times 56.11\times p\div A$$

(4) Hydroxyl Value

The hydroxyl value was measured as follows. Approximately 0.5 grams of a sample (W (g)) was accurately measured in a 100 mL stoppered Erlenmeyer flask, to which was added 20 mL of an acetylation agent (prepared by mixing 5 mL of acetic anhydride in 500 mL of pyridine). The mixture was heated for an hour by immersing the flask in a water bath with a temperature of 95° C. or higher so as to acetylate the hydroxyl group in the sample. After the mixture was removed from the water bath and cooled, 5 mL of water was added to decompose the remaining acetic anhydride. A few drops of phenolphthalein were added as the indicator. Titration was carried out by using a 0.2N KOH solution and the titration volume was recorded when the mixture turned light pink (As (mL)). In the meantime, blank measurement was conducted by the same procedure as above except that the sample was not added, and the titration volume was recorded (Ab (mL)). The hydroxyl value was calculated by the formula below.

$$\text{Hydroxyl value mg } KOH/g = \frac{(Ab-As)\times 0.2\times f}{W}\times 56.11 + \text{acid value} \qquad [\text{formula 2}]$$

f: factor of 0.2N KOH
(B) Method for Evaluating Toner
(5) Storage Stability

Approximately 5 grams of a toner was put into a sample bottle, which was kept in a dryer heated at a constant temperature of 50° C. for about 24 hours. The degree of toner agglomeration was evaluated and set as an index of anti-blocking properties. The evaluation criteria were set as follows:
- ⊚ (remarkably good): the toner is dispersed by simply turning the sample bottle upside down;
- ○ (good): the toner is dispersed when the bottle is turned upside down and hit 2~3 times;
- Δ (usable): the toner is dispersed when the bottle is turned upside down and hit 4~5 times; and
- x (poor): the toner is not dispersed when the bottle is turned upside down and hit 5 times.

(6) Low-Temperature Fixability

A printer having a fixing roller not coated with silicone oil and a roller temperature adjustment mechanism was used by setting the roller speed at 100 mm/s. The toner density was set at 0.5 mg/cm$^2$, and a solid image of 4.5 cm deep×15 cm wide was formed as a test pattern, which was fixed by setting the roller temperature at 145° C. The image density of the test pattern was measured and recorded by a Macbeth densitometer.

To determine the image density, a portion of the test paper was valley folded, on which a sheet of protective paper was placed, and the folded portion was rubbed by sliding a 1-kg weight 5 times to make a crease. The paper was then mountain folded at the crease, on which a sheet of protective paper was placed, and the folded paper was rubbed by sliding a 1-kg weight 5 times. The creased paper was opened up, and a cellophane tape (No. 29, made by Nitto Denko CS Systems Corporation) was placed on the bent portion. After the taped portion was rubbed 5 times, the tape was slowly peeled off, and the image density was measured using a Macbeth densitometer. The same process was conducted at three portions to obtain their respective image densities. The retention rate of each portion was obtained by the formula below from image densities before and after the test procedures. The test pattern was evaluated by the criteria below based on the average retention rate of three tested portions.

Retention rate=Image density after test/Image density before test×100(%)

- ⊚ (remarkably good): the retention rate is 85% or higher;
- ○ (good): the retention rate is in a range of 75% or higher but less than 85%; and
- x (poor): the retention rate is lower than 75% or was not obtained due to an offset phenomenon observed at 145° C.

(7) Hot Offset Resistance

A printer having a fixing roller not coated with silicone oil and a roller temperature adjustment mechanism was used by setting the roller speed at 30 mm/s. The toner density was set at 0.5 mg/cm$^2$, and a solid image of 4.5 cm deep×15 cm wide was printed as a test pattern each time the roller temperature was increased by 5° C. During the testing, if the toner was observed to be transferred to the fixing roller due to a hot offset phenomenon, the lowest temperature of such was determined as the hot offset temperature. The hot offset resistance was evaluated based on the following criteria.
- ⊚ (remarkably good): no hot offset has occurred at 200° C.;
- ○ (good): hot offset has occurred in a range of 185° C.~200° C.; and
- x (poor): hot offset has occurred at or lower than 185° C.

(8) Image Stability

A printer having a fixing roller not coated with silicone oil and a roller temperature adjustment mechanism was used by setting the roller speed at 30 mm/s under conditions of 25° C. and 80 RH %. The toner density was set at 0.5 mg/cm$^2$, and a solid image of 4.5 cm deep×15 cm wide was continuously printed as a test pattern 5000 times at a fixing temperature of 170° C. The change in image density between the first and 5000th printouts were visually evaluated based on the criteria specified below.
- ○ (good): no change is observed, or density is hardly affected;
- Δ (usable limit): change in image density is observed, and is the threshold level for being usable if improved by an additive; and
- x (poor): significant change in image density is observed.

Example 1

Polycarboxylic acid and polyhydric alcohol with the composition specified in Table 1 were placed in a reactor equipped with a distillation column. The speed of the stirring blade in the reactor was kept at 200 rpm, and the temperature was set to rise until the internal temperature of the reaction system reached 265° C., and was then kept there. An esterification reaction was carried out until no water was distilled from the reaction system.

Next, the internal temperature of the reaction system was lowered to be the polycondensation temperature shown in Table 1, and the pressure in the reactor was set to be reduced for approximately 20 minutes, reaching a vacuum degree of 1 kPa or lower. Then, polycondensation was carried out while the diol component was distilled from the reaction system. While a high vacuum degree was maintained, a polycondensation reaction was continued so that the viscosity of the reaction system increased as the polymerization progressed until the torque of the stirring blade indicated a desired softening temperature. When the torque showed a predetermined value, stirring was turned off. Shortly after the stirring was turned off, nitrogen was introduced to the reaction system so that the internal pressure was returned to normal and further increased by nitrogen. Accordingly, the reactant was retrieved from the bottom of the reaction apparatus. When cooled, a polyester resin was obtained. The physical properties of the polyester resin are shown in Table 1.

(Example 2)~(Example 7), (Comparative Example 3)

Polyester resins were obtained through the same procedure as in Example 1 except that the components in a reactor were changed as respectively specified in Table 1. The physical properties and evaluation results of the polyester resins are shown in Table 1.

Comparative Example 1

Polycarboxylic acid and polyhydric alcohol with the composition specified in Table 1 were placed in a reactor equipped with a distillation column. The speed of the stirring blade in the reactor was kept at 200 rpm, and the temperature was set to rise until the internal temperature of the reaction system reached 265° C. and was maintained there. Near the end of the esterification reaction and before no more water distillation was observed from the reaction system, the gelation of the reaction mixture progressed to cause an increase of torque. Since the torque increased at an accelerated pace, the stirring of the mixture was turned off although the esterification reaction was not yet completed. Then, nitrogen was used to increase the pressure for the retrieval of resulting resin from the bottom of the reaction apparatus. During the retrieval process, the viscosity of the reactant was further increased, and part of the reactant was solidified in the reaction apparatus to make its retrieval impossible. In addition, even if a resin was retrieved from the apparatus, unreacted powder material remained as particles in the resin.

Comparative Example 2

Polycarboxylic acid and polyhydric alcohol with the composition specified in Table 1 were placed in a reactor equipped with a distillation column. The speed of the stirring blade in the reactor was kept at 200 rpm, and the temperature was set to rise until the internal temperature of the reaction system reached 265° C. and was maintained there. Then, an esterification reaction was carried out until no more water distillation was observed from the reaction system.

Then, when the internal reaction temperature started to drop to the level of polycondensation temperature shown in Table 1, gelation progressed and an acute increase in the viscosity of the reaction system was observed. The stirring was turned off and nitrogen was introduced to increase the pressure so that the reactant was retrieved from the bottom of the of the reaction apparatus. During the retrieval process, the viscosity of the reactant was further increased, and part of the reactant was solidified in the reaction apparatus to make its retrieval impossible.

As shown in Table 1, when the ratio of hydroxyl value (mg KOH/g) to acid value (mg KOH/g) set at 1 was smaller than 3, the image stability of the toner made from the resin was evaluated to be low (Comparative Example 3), and when the ratio was greater than 26, storage stability and hot offset resistance were evaluated to be low (Comparative Example 2). By contrast, when the ratio of hydroxyl value (mg KOH/g) to acid value (mg KOH/g) set at 1 was 3~26, the storage stability, low-temperature fixability, hot offset resistance and image stability were found to be usable or excellent (Examples 1~7.).

Moreover, at the time of reaction preparation, when the number of carboxyl groups and the number of hydroxyl groups in the monomer mixture were set to have a ratio of 1:1.13~1:1.30 for forming a polyester resin, the storage stability, low-temperature fixability, hot offset resistance and image stability were all found to be usable or excellent (Examples 1~7.)

What is claimed is:
1. A polyester resin, comprising:
a trivalent or higher acid-derived component; and
a bisphenol A-alkylene oxide adduct-derived component,
wherein a content of the bisphenol A-alkylene oxide adduct-derived component is set at 0.01 to 0.35 mol relative to 1 mol of all the acid-derived components, and

TABLE 1

|  |  | Example 1 | Example 2 | Example 3 | Example 4 | Example 5 |
|---|---|---|---|---|---|---|
| Prepared materials (mol) | terephthalic acid | 82 | 82 | 88 | 88 | 82 |
|  | trimellitic anhydride | 18 | 18 | 12 | 12 | 18 |
|  | diol A* | 30 | 25 | 25 | 20 | 30 |
|  | ethylene glycol | 110 | 112 | 100 | 100 | 100 |
| Polymerization catalyst (ppA) | titanium tetrabutoxide | — | — | — | — | — |
| Ratio of functional groups | hydroxyl group/carboxyl group | 1.28 | 1.26 | 1.18 | 1.13 | 1.19 |
| Polycondensation reaction | polymerization temp. (° C.) | 250 | 250 | 240 | 225 | 225 |
|  | polycondensation time (min.) | 114 | 70 | 70 | 72 | 67 |
| Physical properties of resin | Tg (° C.) | 51.8 | 51.1 | 59.7 | 61.5 | 56.1 |
|  | softening temp. (° C.) | 126.9 | 122.2 | 124.7 | 123.8 | 126.3 |
|  | acid value (mg KOH/g) | 3.1 | 4.1 | 6.7 | 13.8 | 9.8 |
|  | hydroxyl value (mg KOH/g) | 60.5 | 58.8 | 47.9 | 44.7 | 58.5 |
|  | hydroxyl value/acid value | 19.5 | 14.3 | 7.1 | 3.2 | 6 |
| Toner characteristics | storage stability | Δ | Δ | ○ | ◎ | ○ |
|  | low-temp fixability | ◎ | ◎ | ◎ | ○ | ◎ |
|  | hot offset resistance | ◎ | ○ | ○ | ○ | ○ |
|  | image stability | ○ | ○ | ○ | ○ | ○ |

|  |  | Example 6 | Example 7 | Comp. Example 1 | Comp. Example 2 | Comp. Example 3 |
|---|---|---|---|---|---|---|
| Prepared materials (mol) | terephthalic acid | 82 | 82 | 82 | 82 | 82 |
|  | trimellitic anhydride | 18 | 18 | 18 | 18 | 18 |
|  | diol A* | 30 | 30 | 20 | 35 | 30 |
|  | ethylene glycol | 100 | 112 | 95 | 110 | 90 |
| Polymerization catalyst (ppA) | titanium tetrabutoxide | 30 ppA (15 ppm) | — | — | — | — |
| Ratio of functional groups | hydroxyl group/carboxyl group | 1.19 | 1.30 | 1.06 | 1.33 | 1.10 |
| Polycondensation reaction | polymerization temp. (° C.) | 225 | 250 | — | 250 | 225 |
|  | polycondensation time (min.) | 52 | 163 | — | 180 | 20 |
| Physical properties of resin | Tg (° C.) | 56 | 50.7 | — | 47.1 | 60.6 |
|  | softening temp. (° C.) | 125.5 | 122.9 | — | 107.1 | 123.2 |
|  | acid value (mg KOH/g) | 10.1 | 2.5 | — | 2.9 | 23.5 |
|  | hydroxyl value (mg KOH/g) | 59.1 | 62.8 | — | 78.8 | 54 |
|  | hydroxyl value/acid value | 5.9 | 25.1 | — | 27.2 | 2.3 |
| Toner characteristics | storage stability | ○ | Δ | — | X | ◎ |
|  | low-temp fixability | ◎ | ◎ | — | ○ | ○ |
|  | hot offset resistance | ○ | ○ | — | X | ○ |
|  | image stability | ○ | ○ | — | ○ | X |

*diol A: polyoxypropylene-(2.3)-2,2-bis(4-hydroxyphenyl)propane a ratio of acid value (mg KOH/g) to hydroxyl value (mg KOH/g) is set to be from 1:3 to 1:26, and wherein a metal content derived from a polymerization catalyst is set at 20 ppm or lower.

2. The polyester resin according to claim 1, wherein the content of trivalent or higher acid-derived component is set at 0.01 to 0.30 mol in 1 mol of all the acid-derived components.

3. A toner, comprising the polyester resin according to claim 1.

4. A method for manufacturing a polyester resin, comprising:

polycondensing a monomer mixture comprising a polyhydric alcohol and a polycarboxylic acid, wherein the monomer mixture comprises a trivalent or higher acid component and 0.01 to 0.35 mol of a bisphenol A-alkylene oxide adduct relative to 1 mol of all the acid components, and a ratio of the number of carboxyl groups to the number of hydroxyl groups at the time of preparing the monomer mixture is set to be from 1:1.13 to 1:1.30.

5. The method for manufacturing a polyester resin according to claim 4, wherein a content of the trivalent or higher acid component is set at 0.01 to 0.30 mol in 1 mol of all the acid components.

6. The method for manufacturing a polyester resin according to claim 4, wherein polymerization is carried out by setting the amount of a polymerization catalyst at 20 ppm or lower.

7. The polyester resin according to claim 2, wherein the metal content derived from a polymerization catalyst is set at 20 ppm or lower.

8. A toner, comprising the polyester resin according to claim 2.

9. The method for manufacturing a polyester resin according to claim 5, wherein polymerization is carried out by setting the amount of a polymerization catalyst at 20 ppm or lower.

* * * * *